No. 688,972. Patented Dec. 17, 1901.
E. C. SEAMAN.
MILK CAN.
(Application filed Jan. 30, 1901.)
(No Model.)
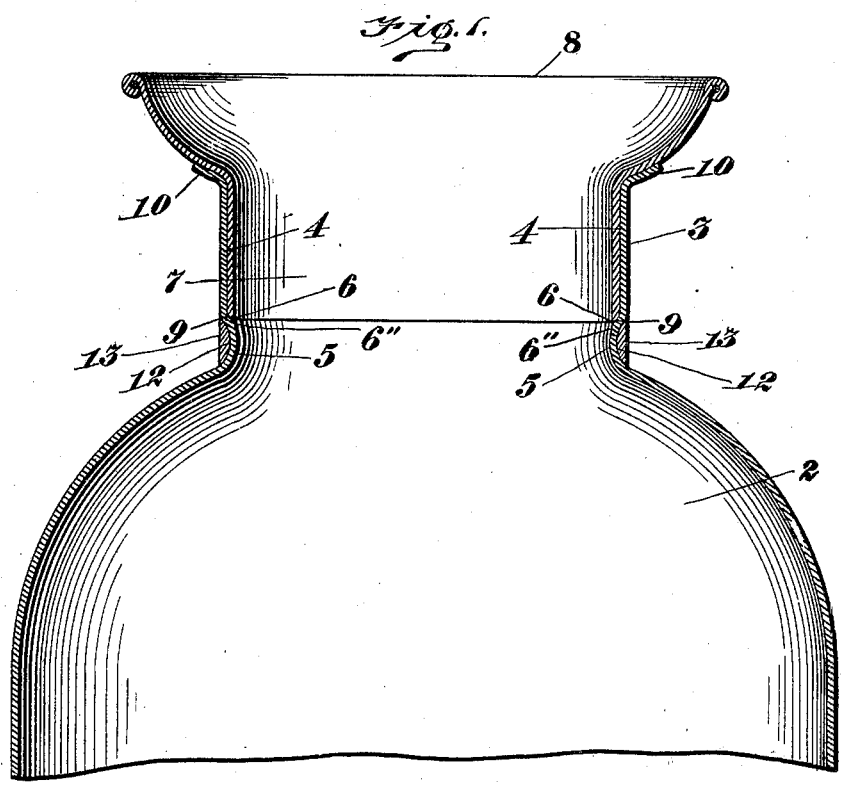
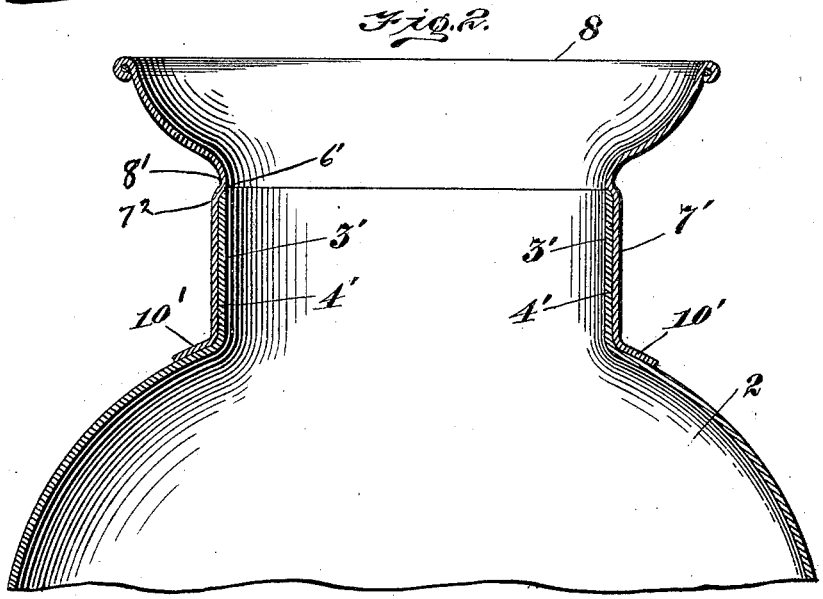
Witnesses
H. S. Dieterich
T. W. Haviland
Inventor
Elizabeth C. Seaman
By her Attorney
F. H. Richards.

UNITED STATES PATENT OFFICE.

ELIZABETH COCHRANE SEAMAN, OF NEW YORK, N. Y.

MILK-CAN.

SPECIFICATION forming part of Letters Patent No. 688,972, dated December 17, 1901.

Application filed January 30, 1901. Serial No. 45,303. (No model.)

*To all whom it may concern:*

Be it known that I, ELIZABETH COCHRANE SEAMAN, a citizen of the United States, residing in New York, in the county of New York and State of New York, have invented certain new and useful Improvements in Milk-Cans, of which the following is a specification.

This invention relates to milk-cans, and more particularly to the construction of the neck thereof, and has for its object the provision of an improved neck.

A further object of the invention is to provide a milk-can with an improved reinforced neck formed by providing the bowl and breast or mouth with overlapping neck members so assembled that a smooth surface on the interior of the neck having all the advantages of a seamless neck is obtained.

In the drawings accompanying and forming part of this specification, Figure 1 is a sectional view of a breast, bowl, and neck constructed in accordance with the present improvement; and Fig. 2 is a similar view showing a reversal of the construction of the breast and bowl presented in Fig. 1.

Similar characters of reference designate corresponding parts in the different figures of the drawings.

It is an advantage, as shown in the prior art, to construct a milk-can with the bowl or mouth, neck, and breast in one piece, provided the neck can be so reinforced that it will not become crushed or bent out of shape in use, since by constructing these parts in one piece there is furnished a smooth seamless surface on the interior of the neck, so that the lodgment of impurities or foul particles of milk in a crevice or joint is positively prevented and so that also the quick and easy cleansing of the can is permitted, it being well known that a few drops of foul milk will render many gallons impure, even during a short railroad journey. While milk-cans having this unreinforced integral bowl or mouth, neck, and breast have been placed upon the market, such cans have the serious drawback that the bowl soon becomes crushed upon the breast or twisted, owing to the weakness of the neck, it being straight, while the bowl and breast are of curved or arched formation, and consequently reinforced. Therefore it has been proposed to manufacture milk-cans with a double neck, one neck being rigid or integral with the bowl and the other integral or rigid with the breast; but in many cans with which I am familiar the neck members have been proposed to be so connected that an abrupt surface or joint is formed on the interior of the can, such surface or joint permitting the lodgment of impure particles of milk and preventing the thorough cleansing of the can.

The present improvement is designed to furnish a double-neck milk-can with the joint located intermediate the juncture of the neck with the bowl and breast, and which neck may have all the advantages of a seamless structure and none of its disadvantages, since the neck being a duplex or double one is very rigid. In the form shown and described, and which may be its preferred form, if desired, the bowl and breast are provided with overlapping neck members, one—as, for instance, the interior neck—being shown with its free edge beveled or chamfered off to provide a substantially flush joint-surface located intermediate the bowl and the breast proper and the other—as, for instance, the exterior neck member—preferably being offset to form an annular interiorly-located recess or shoulder for the engagement of the interiorly-located neck member.

In the form shown in Fig. 1 the breast member 2 has its neck member 3 shown as furnished with an annular interiorly-located shoulder 6, said shoulder being provided in the form shown by bending the metal of the breast near the juncture of its neck to form an exterior recess 12 and an exteriorly-located convex portion or bead 5. The neck member of the breast is thus shown as offset from the inwardly-projecting bead 5, and at the juncture of the bead and neck the shoulder 6 is formed. The neck member 7 of the bowl fits within the breast neck member, and the latter member overlaps the former throughout their lengths. The free or lower end 9 of the neck portion of the bowl is scarfed or beveled off, whereby it is substantially flush with the inner wall 6'' of the shoulder 6, so that for all practical purposes when the parts have been soldered and tinned there is provided a smooth surface and one which will not afford lodgment for particles of milk or prevent the proper cleansing of the can.

In Fig. 2 the bowl 8 is contracted at 8' and the neck member 7' of the bowl is shown as having an offset therefrom at 7² to form a shoulder 6', similar to the shoulder 6, the neck member 3' of the breast 2 being located within the neck member of the bowl. While the neck member of the bowl, which is shown as provided with the shoulder 6, may be only sufficiently wide to overlap the other neck member, it is nevertheless shown provided with a flaring flange 10, which in the form shown in Fig. 1 over or under laps the bowl 8, and thus forms an arch or truss at the juncture-point of the bowl with the neck for reinforcing such bowl. In the form shown in Fig. 2 the neck member of the bowl 8 is provided with this flange 10', which overlaps the metal of the breast, thereby reinforcing the can.

If found desirable, the recess 12, formed by the contracted portion of the breast 5, may be filled or closed in by a suitable reinforcing band or hoop 13, which has an edge located beyond the edge of the point of engagement of the inner neck member with the outer neck member, which band or hoop may conform to the shape of the recess, if desired, whereby a smooth surface will be provided, while at the same time the neck is materially reinforced.

I claim as my invention—

1. A milk-can comprising a bowl or mouth having a neck member, a breast also having a neck member, one neck member overlapping and closely engaging the other neck member throughout substantially their entire area, and a reinforcing device located around the outer neck member and having an extension beyond the edge of the point of engagement of the inner neck member with the outer neck member.

2. A milk-can having two parts, a breast and a bowl, the breast member being formed of a single thickness of metal and provided with a rigid integral neck member, said members overlapping to form a double neck, the inner neck member stopping short of one of said parts and the other neck member having a bent portion engaging the other part of the can.

3. A milk-can comprising two parts, a bowl or mouth having a neck member one of said parts having an annular interiorly-located shoulder adapted to be engaged by the free edge of the neck member of the other part, the interiorly-located neck member being chamfered or beveled off thereby providing a substantially flush joint-surface on the interior of the can, the shouldered neck part having a flange overlapping the part carrying the interiorly-located neck member.

4. A milk-can comprising a bowl having a neck member, a breast having a neck member, one of said neck members being adapted to receive the other neck member and provided with a contracted portion forming a shoulder and an annular bead and a reinforcing device located in the recess formed by said contracted portion.

5. A milk-can comprising a bowl having a neck member and a breast having a neck member one overlapping the other, the inner neck member having its free edge chamfered or beveled off and engaging and merging into the inner surface of the outer neck member to form a substantially flush joint-surface, and a reinforcing device located around the outer neck member.

6. A milk-can comprising a bowl or mouth having a neck member and a breast having a neck member, said neck members overlapping throughout substantially their entire width thereby to form a double neck, one of said neck members having an interiorly-located annular recess forming an offset for the reception of the other of said necks, said inner neck having its free edge chamfered or beveled off thereby to provide a substantially flush joint-surface on the interior of the neck.

ELIZABETH COCHRANE SEAMAN.

Witnesses:
E. R. GILMAN,
C. S. WEED.